United States Patent
Dobschal et al.

(10) Patent No.: US 9,989,766 B2
(45) Date of Patent: *Jun. 5, 2018

(54) SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

(71) Applicant: Carl Zeiss Smart Optics GmbH, Aalen (DE)

(72) Inventors: Hans-Juergen Dobschal, Kleinromstedt (DE); Karsten Lindig, Erfurt (DE); Guenter Rudolph, Jena (DE); Ersun Kartal, Aalen (DE); Lisa Riedel, Jena (DE); Frank Widulle, Neu-Ulm (DE); Michael Patra, Oberkochen (DE)

(73) Assignee: tooz technologies GmbH, Aalen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/304,779

(22) PCT Filed: Apr. 16, 2015

(86) PCT No.: PCT/EP2015/058273
§ 371 (c)(1),
(2) Date: Oct. 17, 2016

(87) PCT Pub. No.: WO2015/158828
PCT Pub. Date: Oct. 22, 2015

(65) Prior Publication Data
US 2017/0045743 A1    Feb. 16, 2017

(30) Foreign Application Priority Data
Apr. 17, 2014   (DE) .................. 10 2014 207 490

(51) Int. Cl.
*G02B 27/14*   (2006.01)
*G03H 1/00*   (2006.01)
(Continued)

(52) U.S. Cl.
CPC .......... *G02B 27/0172* (2013.01); *G02B 6/00* (2013.01); *G02B 27/017* (2013.01); *G02C 7/02* (2013.01);
(Continued)

(58) Field of Classification Search
CPC .......... G02B 27/0172; G02B 27/0101; G02B 27/0149; G02B 27/145; G02B 27/0103;
(Continued)

(56) References Cited

U.S. PATENT DOCUMENTS

| 6,674,504 B1 | 1/2004 | Li et al. |
| 2007/0007859 A1 | 3/2007 | Hirayama |

(Continued)

FOREIGN PATENT DOCUMENTS

| DE | 2347852 A1 | 4/1975 |
| DE | 102011007811 A1 | 10/2012 |

(Continued)

OTHER PUBLICATIONS

International Preliminary Report on Patentability rendered by the International Bureau of WIPO for PCT/EP2015/058273 dated Oct. 27, 2016, 19 pages (including English translation).

(Continued)

*Primary Examiner* — Dawayne A Pinkney
(74) *Attorney, Agent, or Firm* — Skaar Ulbrich Macari, P.A.

(57) ABSTRACT

A spectacle lens for a display device can be fitted on the head of a user and generate an image. The spectacle lens includes a curved front and/or side, wherein a light guiding channel which is suitable for guiding light bundles of pixels of the (Continued)

generated image, which are coupled into the spectacle lens via the coupling-in section of the spectacle lens, in the spectacle lens to the coupling-out section to couple them out of the spectacle lens via the coupling-out section. The coupling-out section includes at least two deflecting surfaces arranged next to each other which reflect the light bundles in the direction of the rear side for the coupling out. Deflecting surfaces can be formed as a switchable layer which can be switched into a first and a second state, wherein the reflectivity of the switchable layers in the first state is higher than in the second state.

17 Claims, 14 Drawing Sheets

(51) Int. Cl.
*G02F 1/1335* (2006.01)
*G03B 21/26* (2006.01)
*G09G 5/00* (2006.01)
*G02B 27/01* (2006.01)
*G02C 7/02* (2006.01)
*G02B 6/00* (2006.01)
*G02F 1/19* (2006.01)

(52) U.S. Cl.
CPC .......... *G02F 1/19* (2013.01); *G02B 2027/013* (2013.01); *G02B 2027/0118* (2013.01); *G02B 2027/0123* (2013.01); *G02B 2027/0178* (2013.01)

(58) Field of Classification Search
CPC ......... G02B 27/01; G09F 19/18; G03B 21/00; G03B 21/14; G09G 3/003; A61B 3/103; A61B 3/14; A61B 3/113; A61B 3/1225
USPC ...... 359/630–634, 13–14; 349/11; 310/49 R, 310/156.32, 156.33, 156.34, 156.35, 310/266–268, 156.02; 353/11–12, 28, 353/119; 345/7, 9; 351/200, 205–206, 351/210, 221
See application file for complete search history.

(56) References Cited

U.S. PATENT DOCUMENTS

| | | |
|---|---|---|
| 2008/0025667 A1 | 1/2008 | Amitai |
| 2011/0142600 A1 | 6/2011 | Winkler et al. |
| 2012/0002294 A1 | 1/2012 | Dobschal et al. |
| 2012/0229367 A1 | 9/2012 | Magyari |
| 2012/0249899 A1* | 10/2012 | Berthelot ................. G02B 3/08 349/13 |
| 2014/0139404 A1 | 5/2014 | Takeda et al. |
| 2015/0138451 A1 | 5/2015 | Amitai |
| 2015/0260992 A1* | 9/2015 | Luttmann .......... G02B 27/0172 359/631 |

FOREIGN PATENT DOCUMENTS

| | | |
|---|---|---|
| DE | 102011007812 A1 | 10/2012 |
| EP | 1748305 A1 | 1/2007 |
| FR | 2681702 A1 | 3/1993 |
| WO | 2011062591 A1 | 5/2011 |
| WO | 2013049248 A2 | 4/2013 |
| WO | 2013175465 A1 | 11/2013 |

OTHER PUBLICATIONS

T.J. Richarson et al., "New electrochromic mirror systems", Solid State Ionics, North Holland Pub. Company, Bd. 165, Nr. 1-4, S. 305-308, Dec. 1, 2003, 4 pages.

"High-efficiency Fabrication Technology for Switchable Mirror Devices Capable of Switching between Mirror and Transparent States", National Institute of Advanced Industrial Science and Technology, Sep. 4, 2012, 3 pages.

* cited by examiner

SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

PRIORITY

This application claims the benefit of German Patent Application No. 102014207490.8 filed on Apr. 17, 2014, which is hereby incorporated herein by reference in its entirety.

FIELD

The present invention relates to a spectacle lens for a display device that can be fitted on the head of a user and generates an image, and a display device with such a spectacle lens.

BACKGROUND

Spectacle lenses often comprise, seen in top view onto the spectacle lens, a coupling-in section (e.g. in an edge area of the spectacle lens) and a coupling-out section (e.g. in a central area of the spectacle lens), wherein the spectacle lens is suitable for guiding light bundles of pixels of the generated image, which are coupled into the spectacle lens via the coupling-in section of the spectacle lens, in a light guiding channel to the coupling-out section, in order to couple them out of the spectacle lens via the coupling-out section. The coupling-out section can comprise at least two deflecting surfaces arranged next to each other which reflect the light bundles in the direction of the rear side for the coupling-out. Because of the reflecting effect of these deflecting surfaces, they are disruptive for the user in particular when no image is being displayed. The reflectivity of the deflecting surfaces leads to them being clearly set apart visually from the surrounding spectacle lens.

SUMMARY

An object of the invention is to provide a spectacle lens for a display device that can be fitted on the head of a user and generate an image, which is developed in such a way that the difficulty named above can be overcome as completely as possible.

The disclosure includes a spectacle lens in which the deflecting surfaces are in each case formed as a switchable layer which can be switched into a first and a second state, wherein the reflectivity of the switchable layers in the first state is higher than in the second state. In particular, the transmissivity in the second state is higher than in the first state.

Because of the switchable layer, which can also be referred to as switchable mirror layer, it is advantageously possible to switch the corresponding deflecting surfaces to be a reflecting surface only at times in which the function of deflecting is required. If, e.g., no image representation is desired, the switchable layer can be switched into the second state and thus into transmission. In the case of image representation, the switchable layer can be switched into the first state only at times, for example, with the result that the reduced transmittance is not disruptive for the user.

The deflecting surfaces can be formed in the spectacle lens. In particular, they can lie on the front side in the spectacle lens or be spaced apart from the front side. In particular, they can be formed such that the front side has its predetermined surface profile and has no other structuring on the surface because of the deflecting surfaces.

The switchable layer of the deflecting surfaces can comprise a liquid crystal layer or an electrochromic layer. In particular, the switchable layer can be formed as an electrically switchable layer.

At least two deflecting surfaces can be arranged next to each other can be switched into the first and second state independently of each other.

The spectacle lens can comprise at least two groups arranged next to each other with in each case at least two deflecting surfaces arranged next to each other, wherein the deflecting surfaces in each case are formed as a switchable layer and the switchable layers of one of the groups can be switched into the first and second state independently of the switchable layers of another group.

The spectacle lens can thus be used variably. For example, a larger eyebox can thus be provided. Furthermore, it is possible to enlarge the field of view or provide fields of view for different directions of view. In order to achieve this, it can be necessary, in addition to the corresponding actuation of the deflecting surfaces, to form the deflecting surfaces oriented appropriately.

The deflecting surfaces can be formed flat or curved. Furthermore, the deflecting surfaces can reproduce a curved reflecting surface in a Fresnel manner which has an imaging property in addition to a pure beam deflection.

The spectacle lens according to the invention can be formed as a spectacle lens with a single shell. However, it is also possible for it to be formed with two shells or more.

The switchable layer can be formed as an optically switchable layer. It can be formed as a passively switchable layer or as an actively switchable layer. By a passively switchable layer is meant in particular a layer which is switched into the first state by the light bundles of the pixels of the generated image itself. By an actively switchable layer is meant in particular a layer which is switched into the first or second state by means of an additional radiation.

The front side and/or rear side of the spectacle lens can comprise a switchable transmission layer. In particular, the switchable transmission layer can be formed on the entire front side and/or on the entire rear side.

The transmittance of the switchable transmission layer can be set and altered. This can be used e.g. in order to set the ratio of brightness of the generated image to the ambient brightness. In particular, the switchable transmission layer can be an electrically switchable transmission layer. It can be formed for example as an electrochromic layer.

The switchable transmission layer can, in particular, be formed in the same way as the switchable layer for the deflecting surfaces.

The coupling-in section can be formed in an edge area of the spectacle lens and the coupling-out section can be formed in a central area of the spectacle lens.

Furthermore, the disclosure includes a display device, including a holder that can be fitted on the head of a user, an image-generating module secured to the holder, which generates an image, and an imaging optical system secured to the holder, which comprises a spectacle lens according to the invention and which, when fitted on the head, images the generated image such that the user can perceive it as a virtual image.

The imaging optical system can comprise the spectacle lens as the only optical element. However, it is also possible for the imaging optical system to comprise, in addition to the spectacle lens, also at least one further optical element. In particular, the spectacle lens can be formed in one piece together with the at least one further optical element.

Thus, the further optical element can be, e.g., a collimation optical system which is arranged between the spectacle lens and the image-generating module, with the result that the light bundles from the image-generating module are coupled into the spectacle lens as collimated bundles.

Furthermore, the display device can comprise a control unit which actuates the switchable layer of the reflecting surface and optionally the switchable second layer of the deflecting surfaces.

The control unit can actuate the switchable layers of the deflecting surfaces such that the deflecting surfaces reflect the light bundles towards the rear side one after the other over time.

In particular, the control unit can actuate the deflecting surfaces such that the field of view is maximized for the user.

The image-generating module can in particular comprise a two-dimensional imaging system, such as e.g. an LCD module, LCoS module, an OLED module or a tilting mirror matrix. The imaging system can be self-luminous or not self-luminous.

The image-generating module can in particular be formed such that it generates a monochromatic or a multi-coloured image.

The display device according to the invention can comprise further elements known to a person skilled in the art which are necessary for its operation.

It is understood that the features named above and those yet to be explained below can be used not only in the stated combinations but also in other combinations or alone, without departing from the scope of the present invention.

Figure 1:
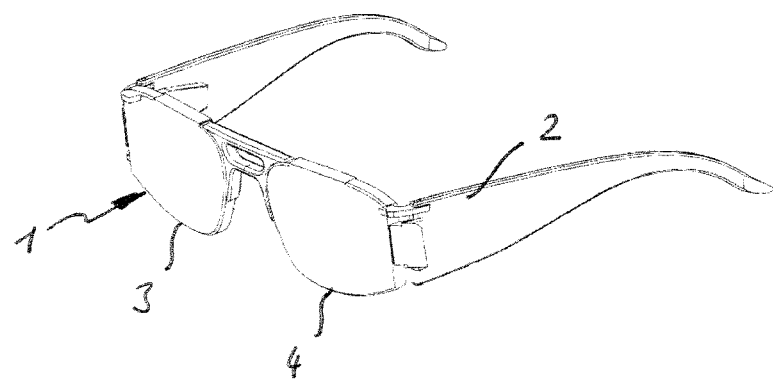
FIG. 1 is a schematic perspective representation of an embodiment of the display device according an example embodiment of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and is formed in the case of the embodiment described here as a conventional spectacles frame, as well as a first and a second spectacle lens 3, 4, which are secured to the holder 2. The holder 2 with the spectacle lenses 3 and 4 can be formed e.g. as sports glasses, sunglasses and/or glasses for correcting defective vision, wherein a virtual image can be reflected into the user's field of view via the first spectacle lens 3, as is described below.

The spectacle lenses 3, 4, and in particular the first spectacle lens 3, are only described together with the display device 1 according to the invention by way of example. The spectacle lenses 3, 4, or at least the first spectacle lens 3, are in each case formed individually as a spectacle lens according to the invention. The second spectacle lens 4 can, of course, (additionally or alternatively) be formed in the same manner as the first spectacle lens 3 which is yet to be described below.

Figure 2:
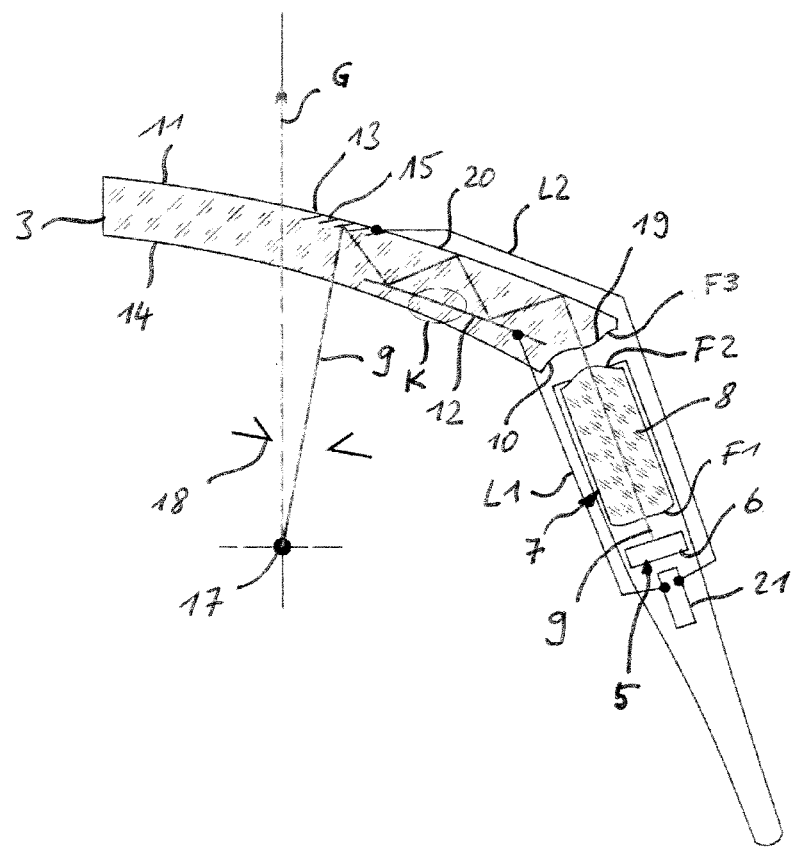
FIG. 2 is an enlarged partial sectional view of the first spectacle lens from FIG. 1.

As can best be seen from the enlarged partial sectional view in FIG. 2, the display device 1 comprises an image-generating module 5, which comprises an imaging system 6 (e.g. an OLED module) with which an image can be generated that is to be reflected into the user's field of view as the virtual image. For this, the display device 1 comprises an imaging optical system 7 which contains an optical element 8 arranged between the imaging system 6 and the first spectacle lens 3. In addition, the first spectacle lens 3 itself also serves as part of the imaging optical system 7.

The imaging system 6 is formed as a two-dimensional imaging system with a plurality of pixels arranged e.g. in columns and rows, wherein a light bundle 9 can emerge from each pixel. The desired image can be generated by correspondingly actuating the pixels. In FIG. 2, the beam path of a light beam is drawn in to represent the light bundles 9, with the result that the light beam 9 is also discussed below.

The light beam 9 emerging from the imaging system 6 enters the optical element 8 via an entry surface F1 of the optical element 8 and exits the optical element 8 via an exit surface F2 which is formed curved. The light beam 9 then enters the first spectacle lens 3 via an entry surface F3 which is formed curved on the end face 10 of the first spectacle lens 3 and strikes the front side 11 of the first spectacle lens at such an angle that a total internal reflection takes place. Through a further total internal reflection on a rear side 14 of the first spectacle lens 3 (more than the two total internal reflections shown can take place), the light beam 9 is guided to a coupling-out section 13, at which the light beam 9 is reflected to the rear side 14 of the first spectacle lens 3 such that it exits the first spectacle lens 3 via the rear side 14. In order to bring about this deflection in the coupling-out section 13, several reflective facets 15, or reflective surfaces, are arranged next to each other.

Thus, when a user is wearing the display device 1 according to the invention on his head as intended, he can perceive the image generated by means of the imaging system 6 as a virtual image when he looks at the coupling-out section 13. In the embodiment described here, the user must look slightly towards the right relative to the direction of view G of a forward view. In FIG. 2, the centre of rotation 17 of the user's eye and the eyebox 18 (the area which is provided by the display device 1 and in which the user's eye can move and he can still see the generated image as a virtual image) is drawn in for clarification. The eyebox 18 can also be referred to as exit pupil 19 of the imaging optical system 7.

The section of the first spectacle lens 3 via which the light beam 9 is coupled into the spectacle lens 3 can be referred to as coupling-in section 19, with the result that the section of the rear side 14 on which the total internal reflection takes place serves, together with the section of the front side 1 on which the total internal reflection takes place, as light guiding channel 20, which guides the beams 9 coupled in via the coupling-in section 19 to the coupling-out section 13. The arrangement of the two sections 13 and 19 and the light guiding channel 20 can be easily recognized in FIG. 3.

Each reflective facet 15 is formed as electrically switchable reflecting surface and can thus also be referred to as electrically switchable facet 15. The electrically switchable facets 15 can be switched into a first and into a second state.

This can e.g. be carried out simultaneously or also individually for each facet 15. The reflectivity in the first state is higher than in the second state and the transmissivity in the second state is higher than in the first state. The electrically switchable facets 15 can thus be switched into a reflection state (first state) or a transmission state (second state).

When the reflective facets 15 are switched into the first state, the light beam 9 is reflected towards the rear side 14 and coupled out via it. To control the electrically switchable facets 15, the display device 1 comprises a control unit 21, which can switch the electrically switchable facets into the first and second state. In FIG. 2, a corresponding control line L2 is also drawn in schematically.

The control unit 21 can switch the reflective facets 15 so quickly back and forth between the two states for example that a user can no longer resolve the individual switchover processes over time. This occurs from about 30 Hz, with the result that the user can then only still perceive the transmission averaged over time in the area of the light guiding channel 20. On the simplified assumption that in the first state the reflectivity is 100% and in the second state the reflectivity is 0%, the user would be able to perceive a reflectivity of 50% if the reflective facets 15 are in the first state for half the time of a predetermined duration and in the second state for the remaining time of the predetermined duration (disregarding the actual duration of the switchover). In this case, the transmissivity would also be 50%, with the result that the user would perceive the surroundings with a lower brightness in the area of the coupling-out section 13.

Of course, a different reflectivity or transmissivity of the reflective facets 15 can also be set. In principle it is possible to set the reflectivity freely in the range of from 0%-100% and thus the transmissivity in the range of from 100%-0%. This depends essentially only on the ratio of the duration of the first state to the duration of the second state.

Preferably, the actuation of the reflective facets 15 can be synchronized with the image generation by means of the imaging system 6. Dark phases can thus occur during the image generation, during which no image generation takes place. In these dark phases, the reflective facets 15 can be switched into the second state. During the other phases of the image generation, the reflective facets 15 are switched into the first state at least at times.

At times when no image is to be generated, the reflective facets 15 can be switched into the second state, with the result that the user can then detect no difference in the area of the coupling-out section 13 from the remainder of the first spectacle lens 3.

The synchronous actuation of the reflective facets 15 and of the imaging system 6 can thus be carried out such that the facets 15 are always switched into the first state when the imaging system is in ON mode. In the first state, the reflective facets 15 have the desired reflectivity, with the result that the coupling-out of the light beams 9 can be carried out in the desired manner.

When the imaging system 6 is in OFF mode, and thus is not generating an image, the reflective facets 15 can be switched into the second state. No reflection thus takes place on the reflective facets, as they are in transmission mode.

Figure 3:
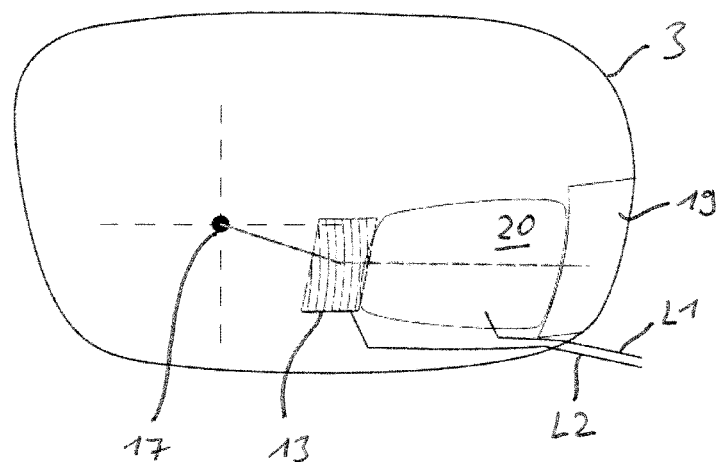
FIG. 3 is a top view of the rear side of the first spectacle lens.

Each reflective facet 15 is formed as electrically switchable reflecting surface which is actuated by means of the control unit 21 via the control line L2 represented schematically in FIGS. 2 and 3.

The reflective facets 15 can bring about a pure beam deflection or can in addition also have an imaging property. The facets 15 themselves can be formed flat or curved. In particular, the facets 15 can reproduce in a Fresnel manner a curved reflecting surface which has the desired deflection and optionally imaging properties.

Figure 4:
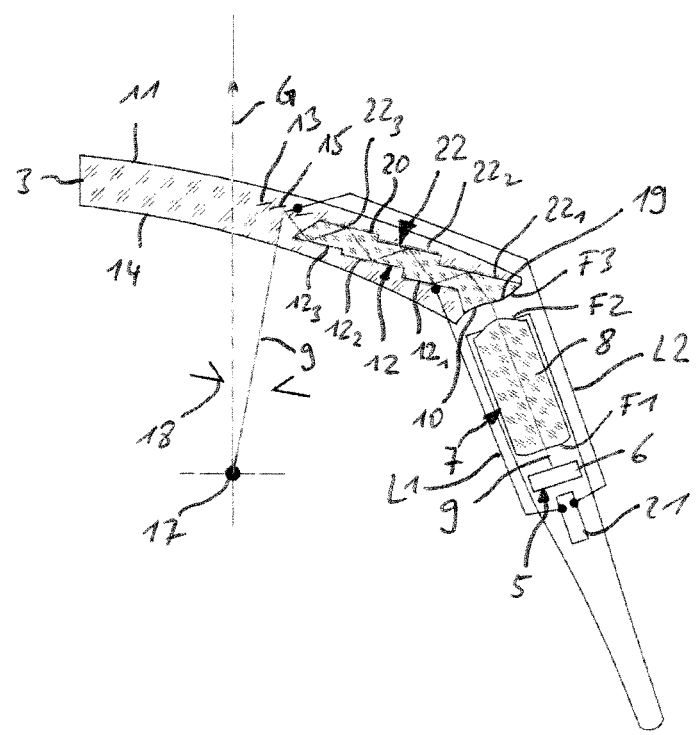
FIG. 4 is an enlarged partial sectional view of the first spectacle lens according to a further example embodiment.

The embodiment shown in FIG. 4 differs from the embodiment from FIG. 2 essentially only in the positioning of the reflective facets 15. In the embodiment according to FIG. 4, the facets 15 are positioned on the front side 11 of the spectacle lens 3 such that the generated image can be perceived by the user in forward view.

Figure 5:
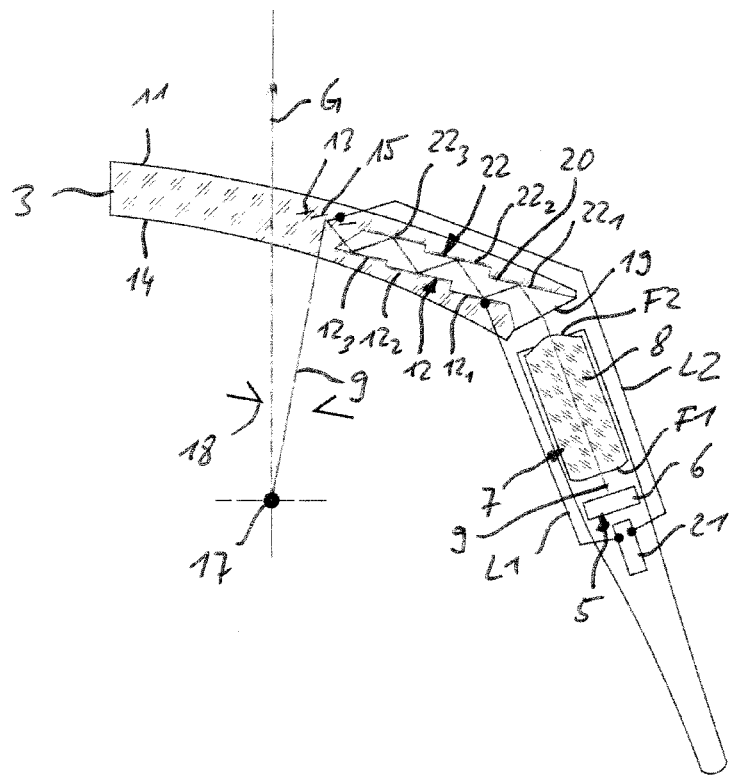
FIG. 5 is an enlarged partial sectional view of the first spectacle lens according to a further example embodiment.

In FIG. 5, a modification is shown in which a first group 25 of switchable reflective facets 15 and next to that a second group 26 of switchable reflective facets 15 are provided. The switchable reflective facets 15 are actuated via control lines L2 and L3 such that those of the first group 25 are switched into the first and second state in each case alternately to those of the second group 26. An enlargement of the eyebox 18 can thus be achieved in a simple manner, as the light beams 9, when the facets 15 of the first group 25 are switched into the second state, are guided by total reflection on the front side 11 and on the rear side 14 to the second group 26 of the reflective facets 15 and can then be reflected in the direction of the rear side 14 by these for the coupling-out, with the result that the desired enlarged eyebox 18 is present.

Figure 6:
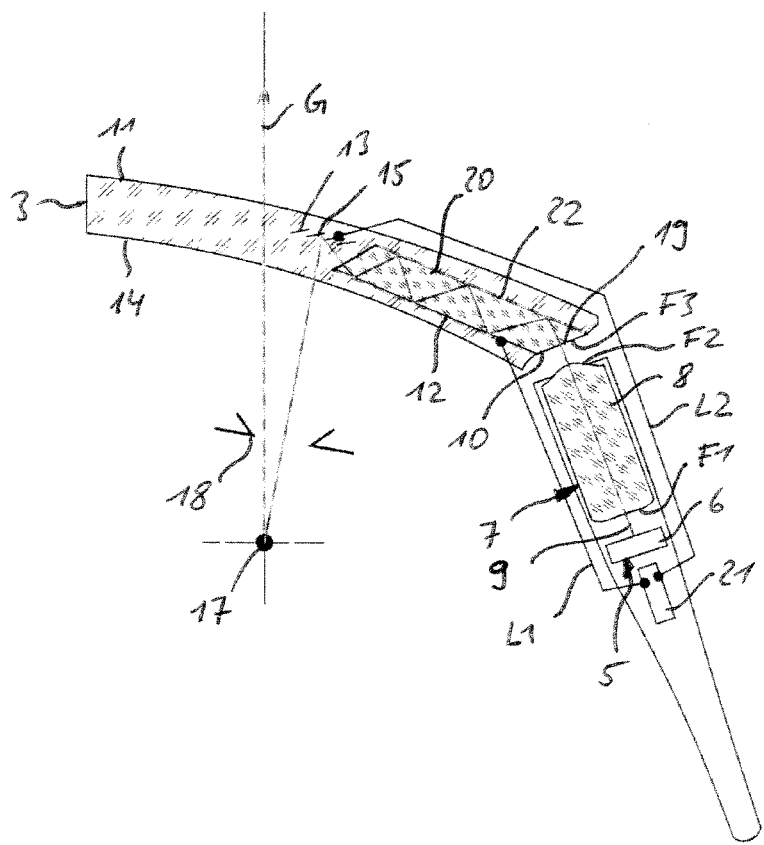
FIG. 6 is an enlarged partial sectional view of the first spectacle lens according to a further example embodiment.

In FIG. 6, a modification of the display device 1 according to the invention is shown, in which three groups 25, 26, 27 of electrically switchable reflective facets 15 are arranged next to each other, which are actuated by means of the control unit 21 via control lines L2, L3, L4 such that the light beams 9 in each case are coupled out by the reflective facets of one of the groups 25 to 27 one after the other. This leads to an enlarged field of view.

Figure 7:
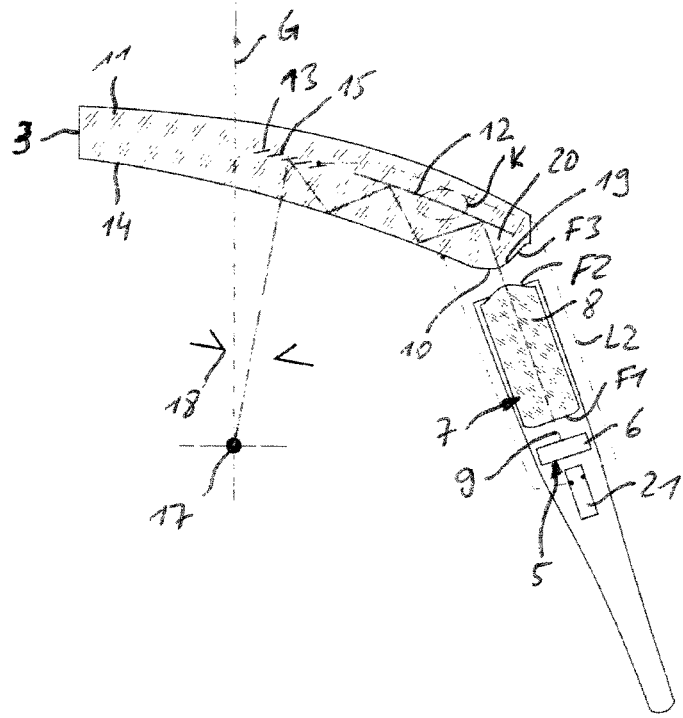
FIG. 7 is an enlarged partial sectional view of the first spectacle lens according to a further example embodiment.

Of course, the reflective facets 15 can also be buried in the spectacle lens such that they are spaced apart from the front side 11, as is shown in FIG. 7.

Figure 8:
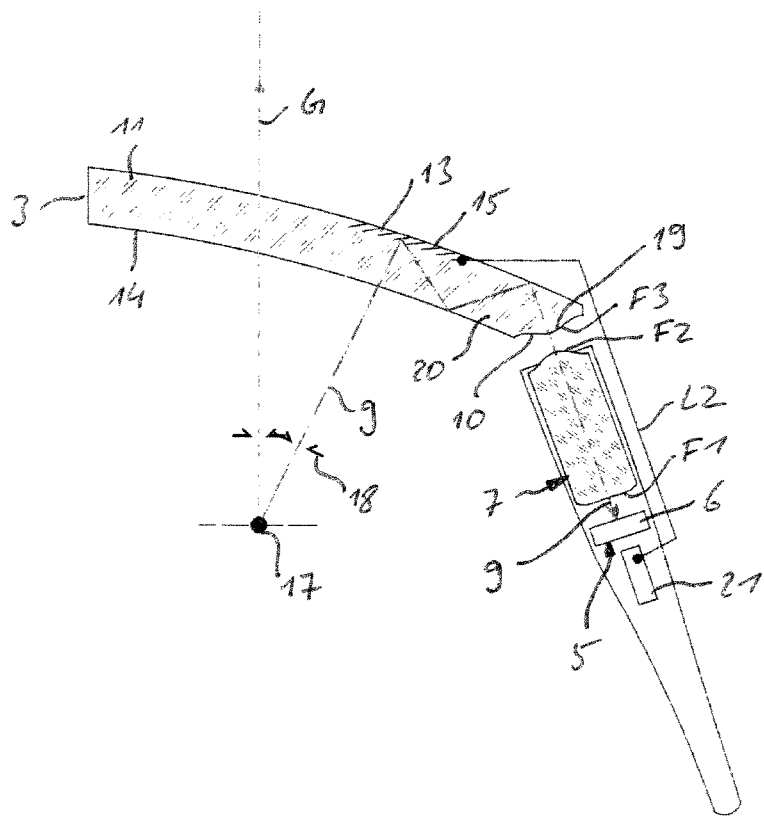
FIG. 8 is an enlarged partial sectional view of the first spectacle lens according to a further example embodiment.

In FIG. 8, a modification is shown in which two groups 25, 26 of electrically switchable reflective facets 15 are provided, wherein the two groups 25 and 26 are spaced so far apart from each other that the user is provided with two fields of view (one in forward view and one in a view towards the right). Of these two groups 25, 26, e.g. one can be selected in order to bring about the image coupling-out in the desired field of view.

Figure 9:
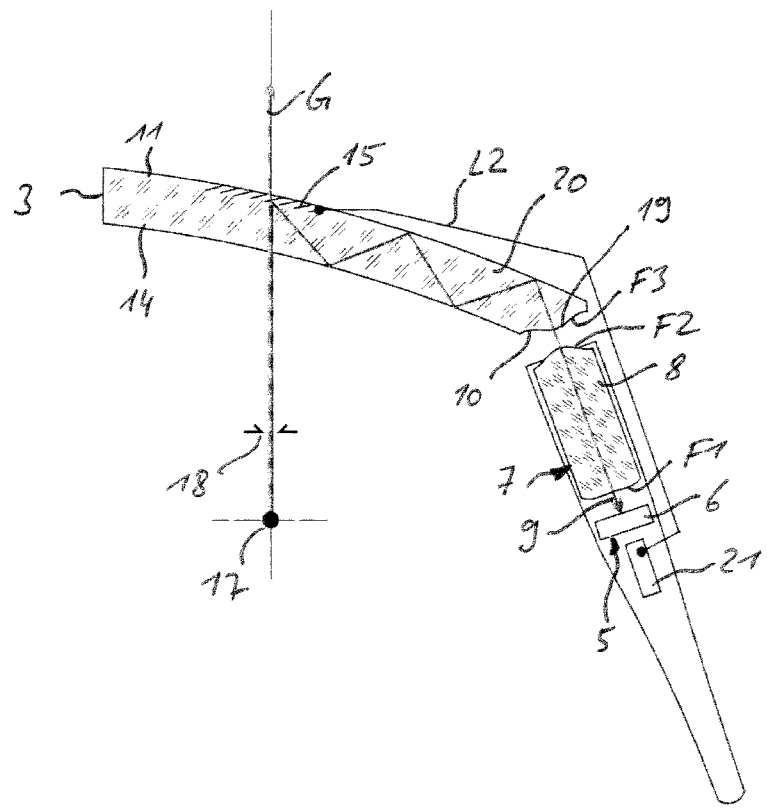
FIG. 9 is an enlarged partial sectional view of the first spectacle lens according to a further example embodiment.

In FIG. 9, a further modification of the display device 1 according to the invention is shown in which, in turn, two groups 25, 26 of electrically switchable, reflective facets are provided. The control unit 21 actuates the facets of the two groups 25, 26 such that always only the facets 15 of one of the two groups 25, 26 serve for the coupling-out. It is thus possible to adapt the coupling-out section 13 to the pupil position. Thus, for example, anatomical differences between different users can be compensated for, such as e.g. the different distance between the temple and the eye of the respective user.

Figure 10:
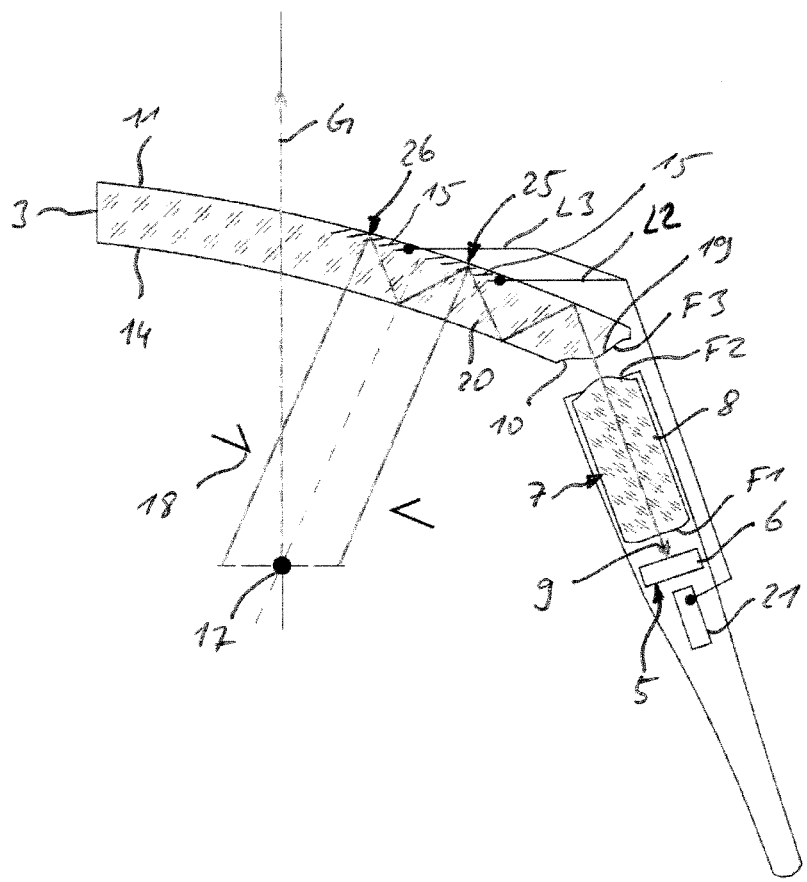
FIG. 10 is a top view onto the rear side of the first spectacle lens according to the embodiment from FIG. 9.

In FIG. 10, a top view of the corresponding spectacle lens from FIG. 9 is shown. It can be easily recognized there that the two groups 25, 26 of facets 17 are spaced apart from each other.

Figure 11:
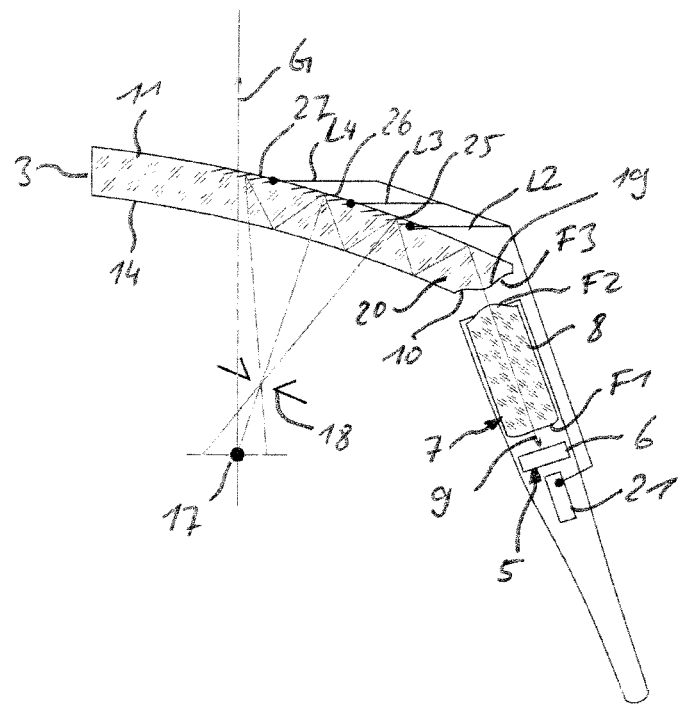
FIG. 11 is an enlarged partial sectional view of the first spectacle lens according to a further example embodiment.

In FIG. 11, an embodiment of the spectacle lens 3 according to the invention is shown in which an electrically switchable reflecting surface 12 is formed in the first spectacle lens 3. For clarification, a circular line K is drawn in which, however, is not present in the actual spectacle lens 3. The reflecting surface 12 is formed flat and can be switched into a first and a second state, wherein the reflectivity in the first state is higher than in the second state, in the same manner as the electrically switchable facets 15. For this, the reflecting surface 12 is connected to the control unit 21 via a line L1. In this embodiment, the guiding of the light bundles takes place through total internal reflection on the front side 14 and reflection on the reflecting surface 12. Thus, the reflecting surface 12 together with the corresponding section of the front side 11 forms the light guiding channel 20, which guides the beams 9 coupled in via the coupling-in section 19 to the coupling-out section 13.

The reflecting surface 12 can be actuated in the same manner as the reflective facets. In particular, the actuation of the reflecting surface 12 can be synchronized with the image generation by means of the imaging system 6. Dark phases can thus occur during the image generation, during which no image generation takes place. In these dark phases, the reflecting surface 12 can be switched into the second state. During the other phases of the image generation, the reflecting surface 12 is switched into the first state at least at times. At times when no image is to be generated, the reflecting surface 12 can be switched into the second state, with the result that the user can then detect no difference in the area of the light guiding channel 20 from the remainder of the first spectacle lens.

In principle, the reflectivity of the reflecting surface 12 can be freely set in the range of from 0% to 100%. Then, a transmissivity in the range of from 100% to 0% is thus present. The set reflectivity and thus also the set transmissivity depends essentially only on the ratio of the duration of the first state to the duration of the second state.

Figure 12:
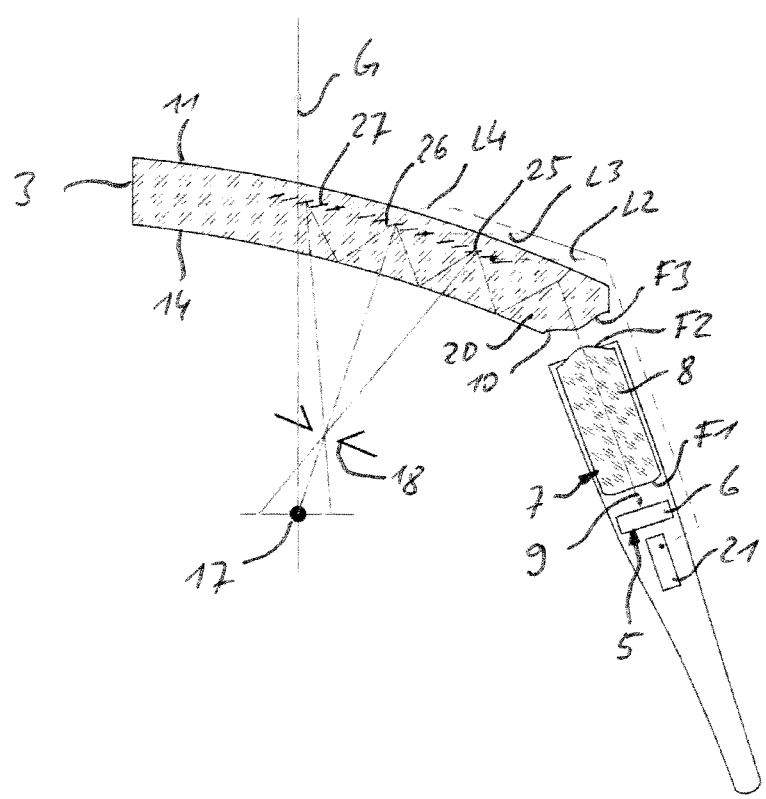
FIG. 12 is an enlarged partial sectional view of the first spectacle lens according to a further example embodiment.

In the embodiment according to FIG. 11, the reflecting surface 12 is formed as a flat continuous surface. However, it is also possible to divide the surface into flat partial sections $12_1$, $12_2$, $12_3$ and to arrange the curvature of the spectacle lens correspondingly like steps, as is shown in FIG. 12. Furthermore, in the embodiment from FIG. 12, unlike the embodiment according to FIG. 11, the reflection no longer takes place on the front side 11, as a second electrically switchable reflecting surface 22 is formed which is opposite the first reflecting surface 12 and comprises partial sections $22_1$, $22_2$, $22_3$ which are offset like steps in the same manner. To simplify the representation, the control line for the second reflecting surface 22 is not drawn in FIG. 12. Between the two reflecting surfaces 12 and 22, a material is filled in which corresponds, for example, to the material of the first spectacle lens 3. Furthermore, in the embodiment according to FIG. 12, the reflective facets 15 are not formed on the front side 11, but rather are buried in the spectacle lens 3.

The actuation of the two reflecting surfaces 12 and 22 and of the reflective facets 15 takes place, in turn, via the control unit 21 in a synchronous manner with each other and also preferably synchronously with the imaging system 6.

Figure 13:
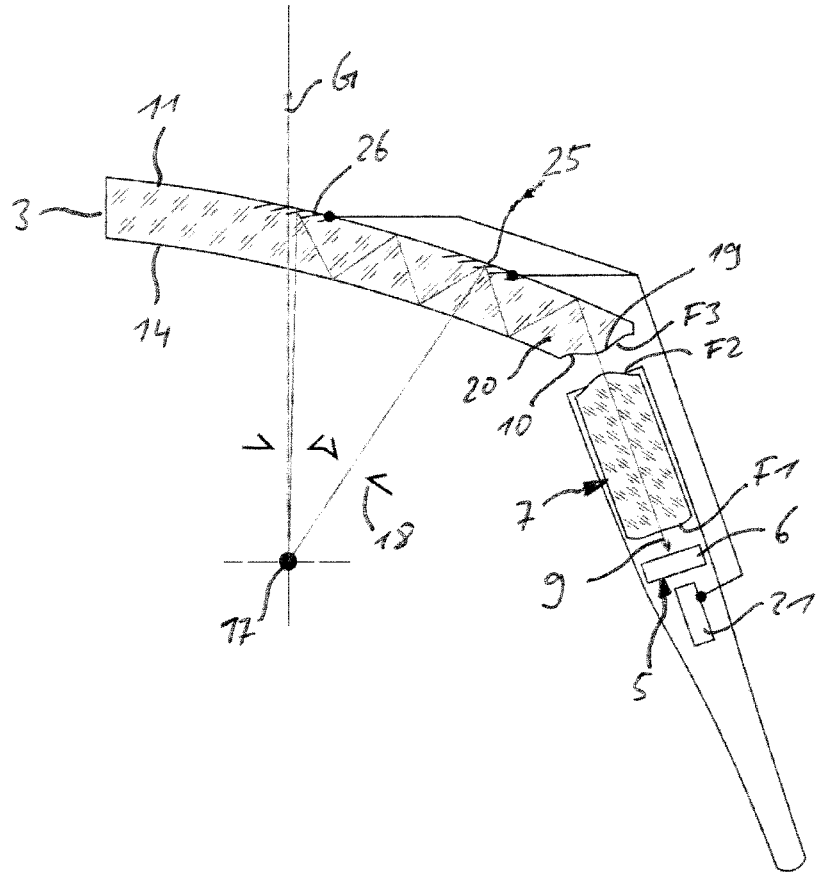
FIG. 13 is an enlarged partial sectional view of the first spectacle lens according to a further example embodiment.

The embodiment according to FIG. 13 differs from the embodiment according to FIG. 12 only in that no material is filled in between the two reflecting surfaces 12 and 22, but rather there is a cavity and air is thus present.

Figure 14:
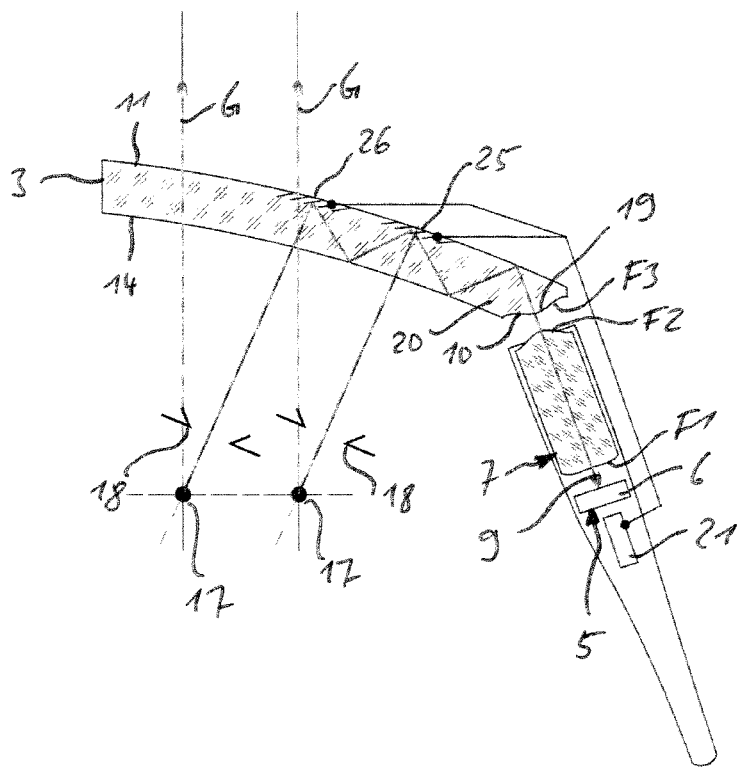
FIG. 14 is an enlarged partial sectional view of the first spectacle lens according to a further example embodiment.

In FIG. 14, a further modification of the embodiment according to FIG. 12 is shown, wherein in this case the two reflecting surfaces 12 and 22 are formed as continuous flat surfaces. The area between the two reflecting surfaces 12 and 22 can be filled with material (e.g. the same material as that of the first spectacle lens) or be formed as a cavity (e.g. filled with air). The light guiding channel 20 can thus be designed by choosing the material according to the optical framework conditions present.

Figure 15:
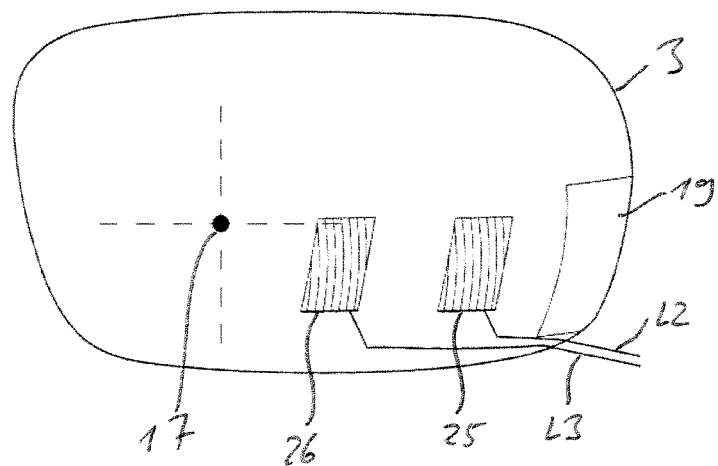
FIG. 15 is an enlarged partial sectional view of the first spectacle lens according to a further example embodiment.

In the embodiment shown in FIG. 15, the light guiding channel 20 is formed by the switchable reflecting surface 12 and the opposite section of the rear side 14 of the spectacle lens. Furthermore, in this embodiment the reflective facets 15 are arranged buried in the spectacle lens 3 such that they are spaced apart from the front side 11. Such a buried formation of the reflective facets 15 leads e.g. to the reflective facets 15 being well protected against environmental effects.

Figure 16:
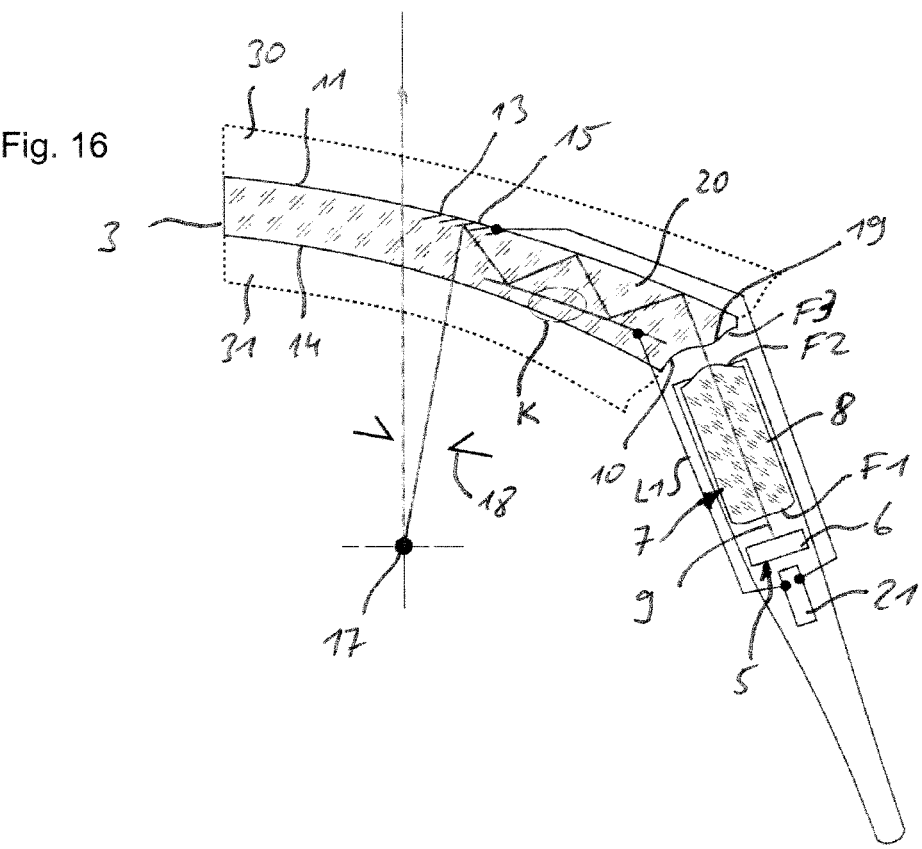
FIG. 16 is an enlarged partial sectional view of the first spectacle lens according to a further example embodiment.

In FIG. 16, a modification of the embodiment according to FIG. 11 is represented. In this modification, a front spectacle lens element 30 and a rear spectacle lens element 31 are drawn in with dotted lines. In this case, the spectacle lens 3 has a three-shell structure. It is also possible for only one of the two spectacle lens elements 30, 31 to be provided, with the result that a two-shell structure is then present.

If the front spectacle lens element 30 is provided, it must only be ensured that the drawn-in reflection takes place on the front side 11, which is now inside the spectacle lens. This can be achieved e.g. by appropriately choosing the material for the front spectacle lens element. Alternatively, a partially reflective coating, a switchable reflecting surface or similar can be provided.

This multi-shell formation of the spectacle lens 3 can be provided for all described embodiments.

The electrically switchable reflecting surface 12, 22 can be formed as an electrochromic layer. For this, for example, it can comprise, as is shown schematically in FIG. 17, a transparent conductive oxide layer 40, an electron layer 41, an ion conductive layer 42, an electron layer 43 and a transparent conductive oxide layer 44 formed one on top of another in this sequence. Such a layer system can be switched from the first state (reflection state) into the second state (transmission state) by applying a predetermined voltage. A switchable mirror surface is thus present.

Such electrochromic layer systems for forming switchable mirrors are known to a person skilled in the art. For example, they can be formed as indicated in the article "New electrochromic mirror systems", Thomas J. Richardson, Solid State Ionics 165 (2003) 305-308. It is also possible to form the layer system such that it comprises a transparent electrode, a switchable mirror layer made of metal, a catalyst layer made of metal, an electrolyte adhesive layer, an ion storage layer (oxide layer) and a transparent electrode stacked one on top of another in this sequence, as is described e.g. in the press release, published on the Internet, of the National Institute of Advanced Industrial Science and Technology of Japan with the title "High-efficiency Fabrication Technology for Switchable Mirror Devices Capable of Switching between Mirror and Transparent States".

Figure 17:
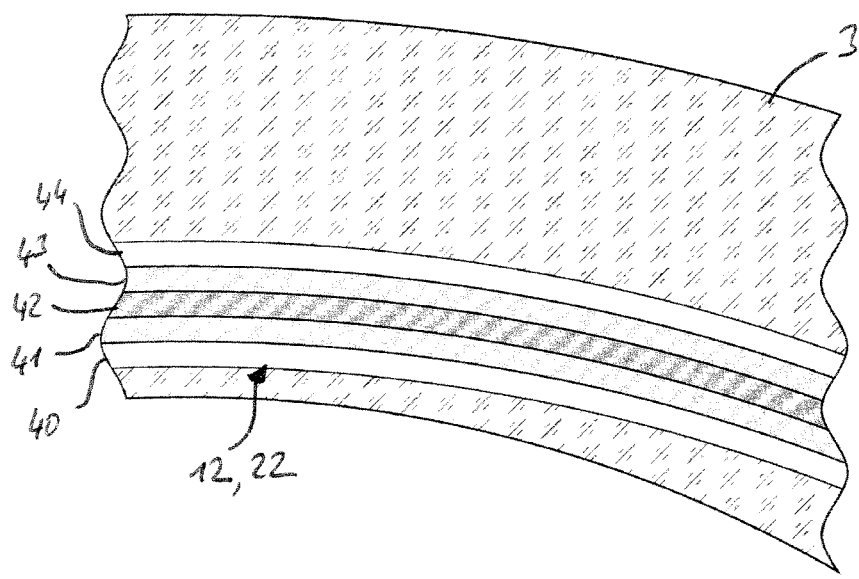
FIG. 17 is an enlarged representation to explain the layer structure of the electrically switchable reflecting surface.
Figure 18:
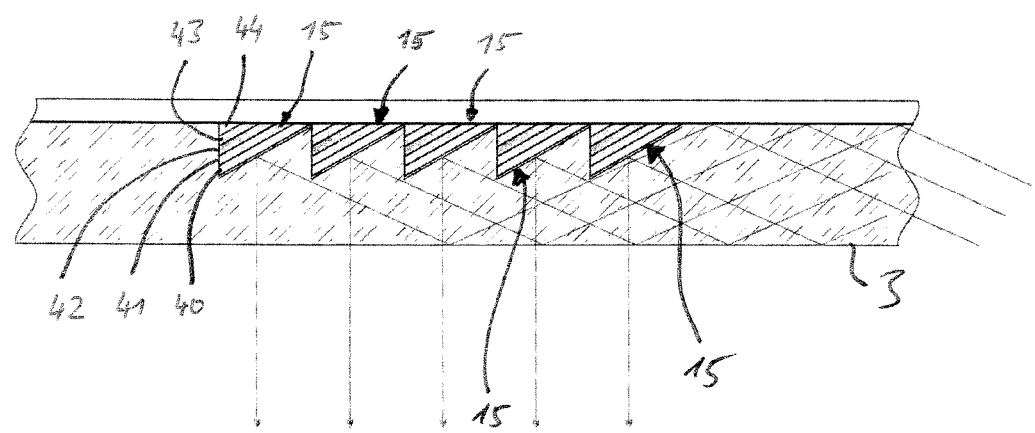
FIG. 18 is a sectional view to explain the layer structure of the reflective facets.

As is shown in FIG. 18, the reflective facets 15 can also comprise the same layer structure as is indicated in connection with FIG. 17 for the switchable reflecting surface 12, 22.

Figure 19:
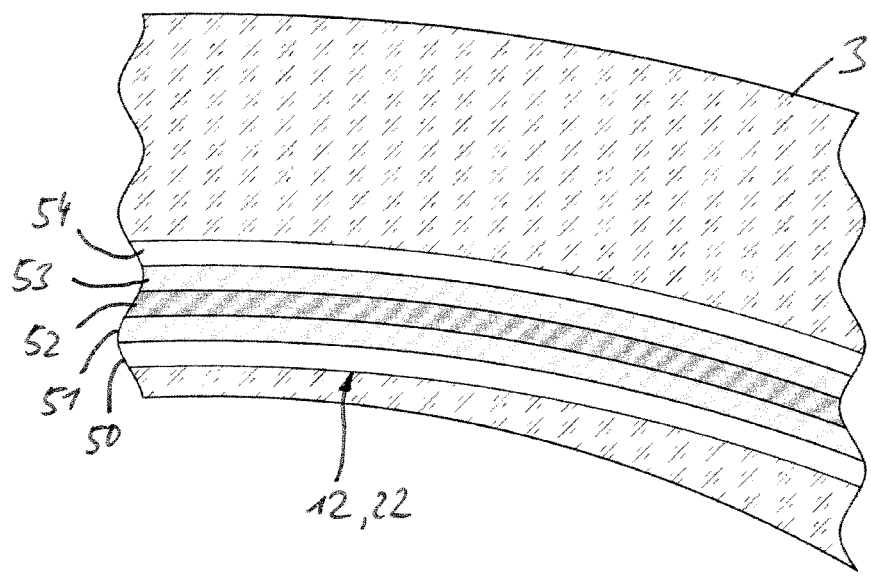
FIG. 19 is a sectional view to explain the layer structure of the electrically switchable reflecting surface.

It is further possible to form the switchable reflecting surface 12, 22 as a liquid crystal layer system, as is represented schematically in FIG. 19. This layer system comprises an analysis layer 50, a transparent conductive oxide layer 51, a liquid crystal layer 52, a transparent conductive oxide layer 53 and a polarizing layer 54, stacked one on top of another in this sequence. Such a layer system can also be switched back and forth between a reflection state and a transmission state by applying a voltage. The polarizing and analysis layers 54, 50 are optional and can also be omitted.

Such layer systems are also known to a person skilled in the art. Reference is made purely by way of example to U.S. Pat. No. 6,674,504 B1 and DE 10 2009 057 987 A1, in which specific designs of such layer systems are indicated.

Figure 20:
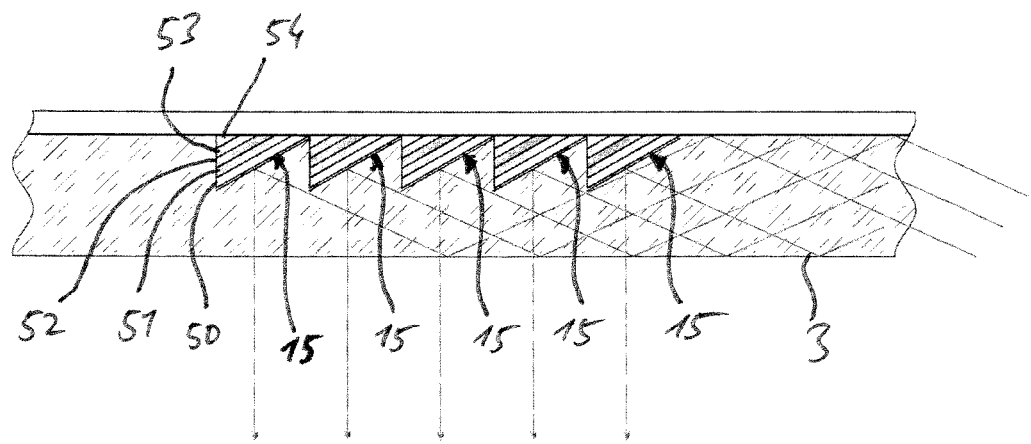
FIG. 20 is a sectional view to explain the layer structure of the reflective facets.

The liquid crystal layer system can also be used for the reflective facets 15, as is represented schematically in FIG. 20.

Figure 21:
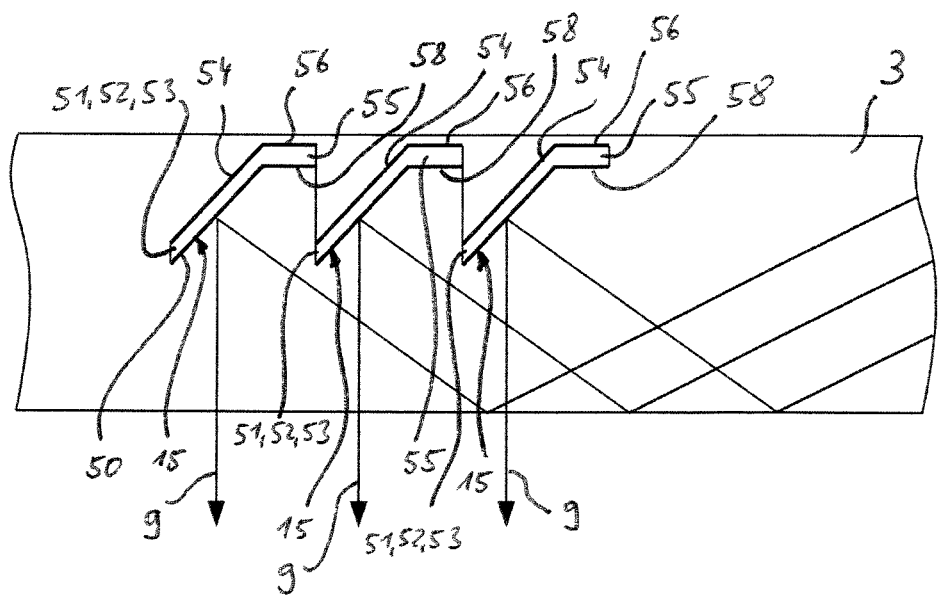
FIG. 21 is a sectional view to explain a further layer structure of an embodiment of the reflective facets.

A modification of the embodiment from FIG. 20 is shown in FIG. 21. In this modification, the reflective facets 15 are spaced apart from each other and in each case flat intermediate pieces 55 are provided. The intermediate pieces 55 can in each case be arranged e.g. parallel to the tangent of the front side 11 at a point directly above the corresponding intermediate piece 55 or at an angle relative to this. Furthermore, the overall thickness of the layer structure is clearly reduced, as is represented schematically in FIG. 21.

Furthermore, in the embodiment according to FIG. 21, each facet 15 can be actuated individually. For this, on the upper side of the flat intermediate piece 55, a first contacting surface 56 is formed, which is connected to a transparent strip conductor 57, as is indicated in the schematic top view from FIG. 22. Due to the flat design of the intermediate piece 55, the contacting is possible in a simple manner. Furthermore, the underside of the flat intermediate piece 55 is provided with a second contacting surface 58 which is connected to a transparent strip conductor 59. This type of contacting is represented in the schematic top view from FIG. 22, wherein here only the contacting surfaces 56 and 58 as well as the transparent strip conductors 57 and 59 are represented schematically. The transparent strip conductors 57, 59 are guided to the control unit 21.

Through this type of contacting, each reflective facet 15 can be actuated individually. Production in a method using layers is also easily possible.

The layer structure of the reflective facets 15 can (but does not have to) extend in the area of the flat intermediate piece 55, or can thus form the flat intermediate piece 55.

Figure 22:
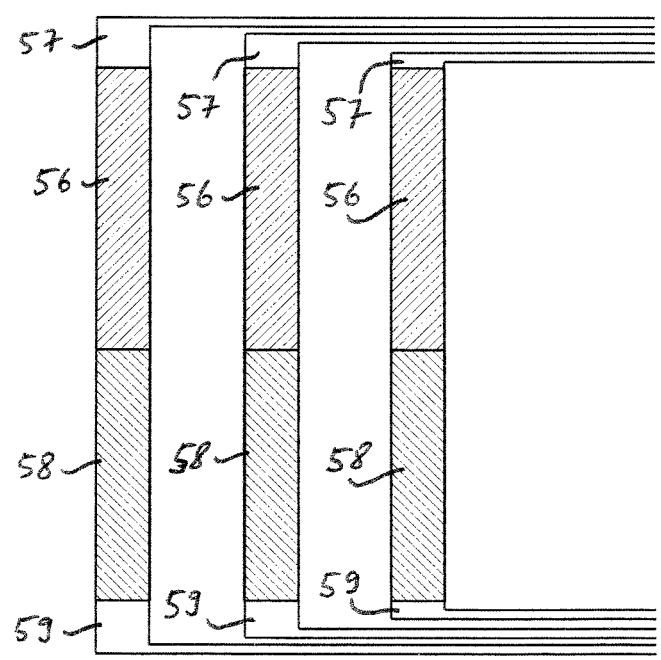
FIG. 22 is a top view to explain the contacting of the reflective facets according to FIG. 21.

In the representation shown in FIG. 22, the contacting surfaces 56 and 58 extend in each case only approximately to the centre of the flat intermediate pieces 55 when seen in a direction from top to bottom in FIG. 22. Of course, they can also extend over the entire length of the flat intermediate pieces 55 in this direction.

The electrically switchable reflecting surface 12, 22 and/or the actuatable electrically switchable reflective facets 15 can in particular also be actuated such that the image brightness of the generated image is thus controlled or regulated. This can be carried out, e.g., in dependence on the ambient brightness. Thus, the reflecting surface 12, 22 and/or the reflective facets 15 can be actuated such that they transmit the maximum image brightness or an image brightness that is less than the maximum. In this manner, a control or regulation of the image brightness and/or of the brightness contrast (image brightness to ambient brightness) can be carried out in a simple manner.

To control or regulate the brightness contrast, an electrochromic layer, which can likewise be actuated by means of the control unit 21, can be arranged over the whole surface on the front side 11 of the first spectacle lens 3. In this case, it is possible to dim the transmission of the first spectacle lens and thus set the desired brightness contrast.

Figure 23:
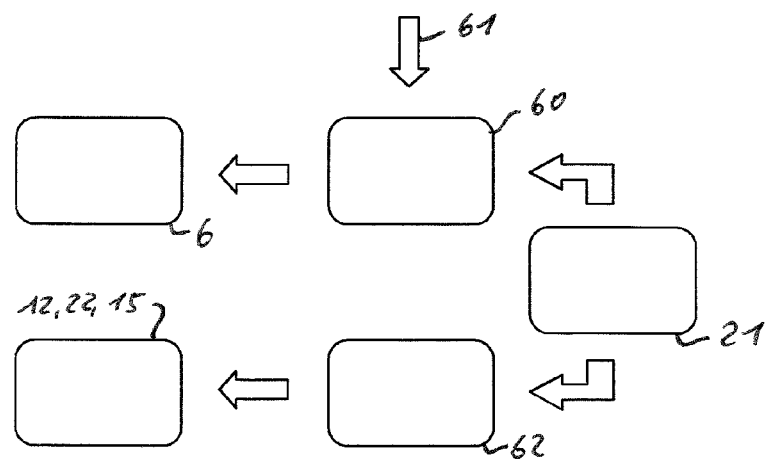
FIG. 23 is a schematic representation to explain the actuation of the electrically switchable reflective layers, the electrically actuatable reflective facets and the imaging system.

As has already been described, the electrically switchable reflecting surfaces 12, 22 and the electrically switchable reflective facets 15 can be switched back and forth between a first and a second state, wherein the reflectivity in the first state is higher than in the second state. Thus, e.g., for simplification it can be assumed that the reflectivity is 100% in the first state and 0% in the second state. The control unit 21 can ensure that the imaging system 6 on the one hand and the correspondingly switchable layers 11, 22, or facets 15, on the other hand are actuated synchronously. For this, the control unit 21 can actuate a corresponding imaging system actuation 60, which is supplied with video data 61 and which actuates the imaging system 6, and a corresponding layer actuation 62, which actuates the reflective layers 12, 22 and the reflective facets 15, such that these are synchronized. The corresponding actuation is represented schematically in FIG. 23.

The actuation by means of the control unit 21 can now take place such that the switching back and forth between the two states is carried out at a frequency of 30 Hz or more.

In this case, a user can only still perceive the reflection or transmission of these layers 12, 22, or of the reflective facets 15 averaged over time.

By setting the duty factor (thus the ratio of the duration of the first state to the second state), each desired reflection can thus be set in a simple manner.

Figure 24A:
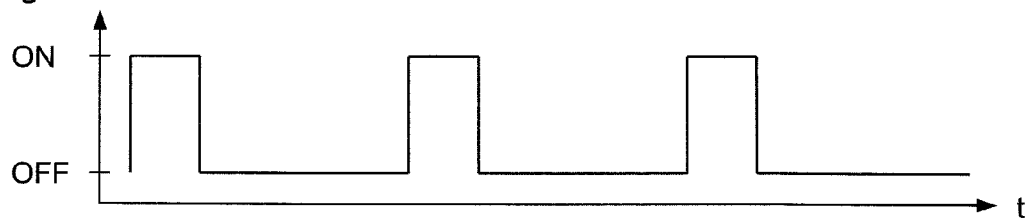
FIGS. 24A-24D are representations to explain the settable duty factors of the electrically switchable reflective layers and the reflective facets.

In the schematic representation shown in FIG. 24A, the duty factor is 25%. This means that for 25% of the time t the reflective layers 12, 22 and/or the reflective facets 15 are in the first state (100% reflectivity) and for the remaining time they are in the second state (the switchover time is disregarded for simplification). The first state can also be referred to as the ON state, and the second state can also be referred to as the OFF state.

The reflectivity is thus 25% of the maximum reflectivity and the transmittance is 75% of the maximum transmittance.

Figure 24B:
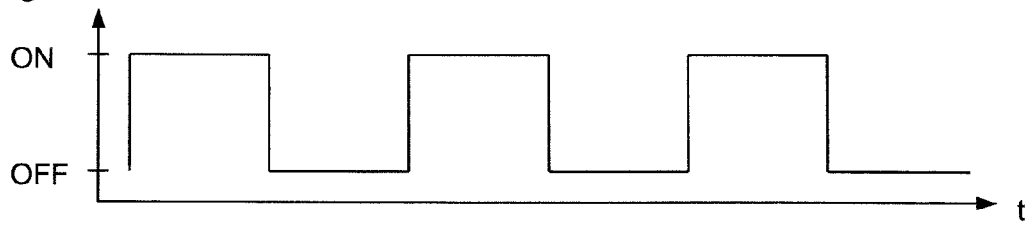
Figure 24C:
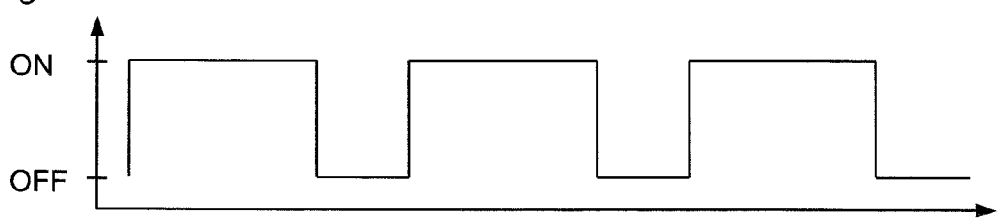
Figure 24D:
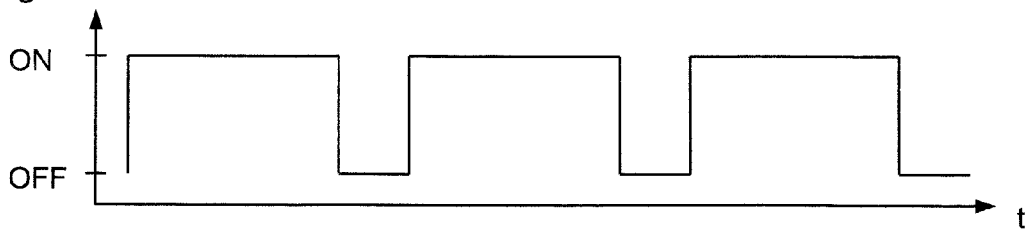

In the duty factor represented in FIG. 24B, the reflectivity is 50% of the maximum reflectivity. In FIG. 24C and FIG. 24D, duty factors for a reflectivity of approx. 66.6% and 75% of the maximum reflectivity are shown.

In the embodiments described up to now, the facets 15 and the reflecting surfaces 12 and 22 are in each case formed such that they are electrically switchable. However, it is also possible to form these surfaces as optically switchable surfaces 15, 12 and 22. For this, for example, it is possible to exploit the fact that the light coming from the image-generating module 5 (light beams 9) is time-modulated and thus has a higher intensity, at least intermittently, than the ambient light, as is represented schematically in FIG. 25.

Figure 25:
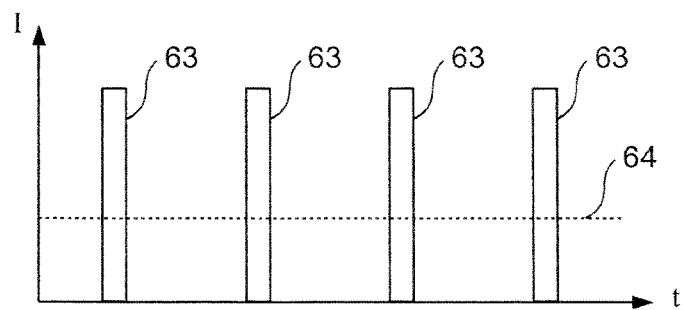
FIG. 25 is a schematic representation to explain the intensity of the light of the image-generating module in comparison with the ambient light as a function of time.

In FIG. 25, the intensity I is plotted against the time t, wherein the light of the image-generating module 5 is indicated with the reference number 63 and the ambient light is indicated with the reference number 64. The representation in FIG. 25 is purely schematic. Thus, the intensity of the light of the image-generating module 5 can in reality be more than one order of magnitude higher than the intensity of the ambient light.

This difference in the intensity can e.g. be used in such a way that a material with non-linear electric susceptibility is used as reflecting layer or reflecting coating.

Figure 26:
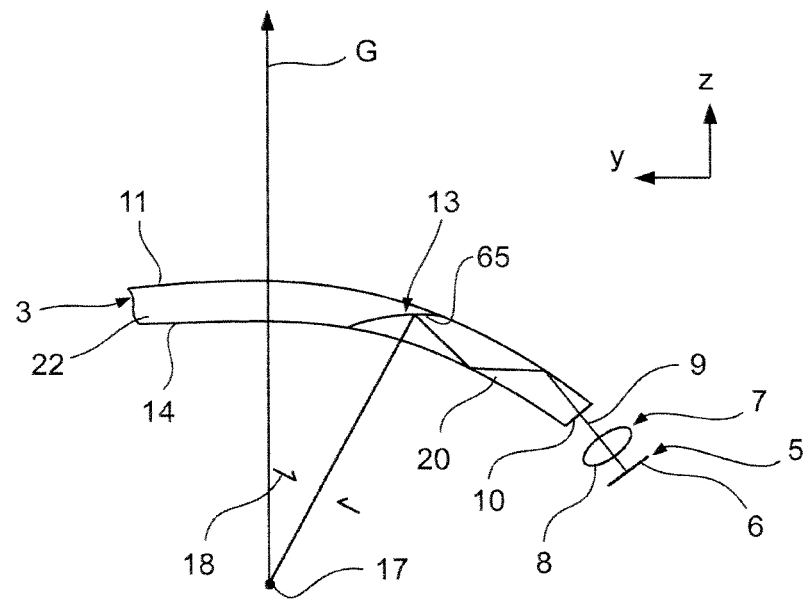
FIG. 26 is an enlarged partial sectional view of the first spectacle lens according to a further embodiment.

This is shown schematically in the sectional view according to FIG. 26, wherein here the coupling-out section 13 comprises a single continuous layer 65. However, this is meant only by way of example. Of course, in the same manner, the already described facets 15, the reflecting surface 12 and/or the reflecting surface 22 can comprise a layer or coating made from such a material with non-linear electric susceptibility.

For example, lithium niobate (LiNbO$_3$) can be used as the material, the corresponding coefficient $d_{33}$ of which, along the axis with the strongest non-linearity, has a value of about 30 pm/V according to the following formula $$P = 2 \cdot \epsilon_0 \cdot d_{33} \cdot E^2$$

In this formula, P is the polarization, $\epsilon_0$ the absolute permittivity and E the electrical field strength. Ultimately this means that the electric susceptibility $\chi_e$, which is defined according to the following formula $$\vec{P} = \epsilon_0 \cdot \chi_e \cdot \vec{E}$$

becomes dependent on the field strength. The refractive index n thus becomes, according to the following formula, $$n = \sqrt{1 + \chi_e}$$

also dependent on the field strength, wherein this formula applies in the case that the material is not magnetic. From the known Fresnel formulae, the field strength-dependent reflectivity can then be determined.

Thus, the layer 65 has a higher reflectivity for the light 9 of the image-generating module 5 than for the ambient light, with the result that the surface 65 is optically switched. A passive optical switching is effectively present, as the light of the image-generating module 5 itself brings about the switchover of the layer 65.

Furthermore, it is possible to form the surface 65 from a photorefractive material which changes its refractive index for a certain time under illumination. Such photorefractive materials are e.g. BaTiO$_3$, KNbO$_3$ and LiNbO$_3$. The change in the refractive index, in accordance with the Fresnel formulae, in turn leads to a change in the reflectivity. Depending on the refractive index of the surrounding material (higher or lower than that of the photoreactive material), an increase or decrease in the reflectivity can be achieved as the intensity grows.

Coatings can also be used which reflect or are transparent depending on the brightness. For instance, the company Schott A G from Mainz in Germany markets, under the product name Mirona, a mirror which loses its reflectivity and becomes transparent when it is bright behind the mirror. If it is dark behind the mirror, it is reflective.

Figure 27:
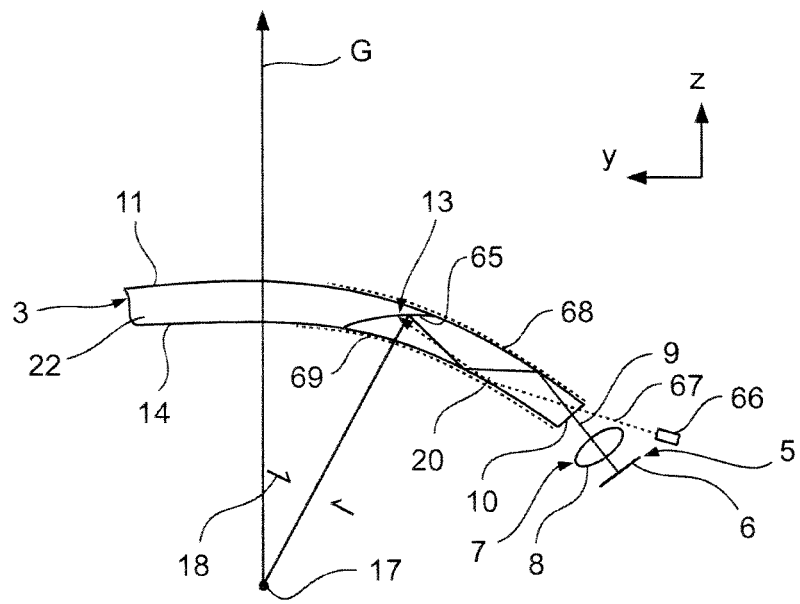
FIG. 27 is an enlarged partial sectional view of the first spectacle lens according to a further embodiment.

Such coatings can be formed such that the switchover effect between reflection and transmission is brought about by radiation in the UV range or from the infrared range. In this case it is possible, by means of an auxiliary radiation source 66, as is represented schematically in FIG. 27, to switch the reflective layer 65 back and forth between reflection and transmission. An optical layer is thus present which is actively switchable. If the radiation 67 of the auxiliary radiation source 66 is required to generate the transmissive state of the reflective layer 65, the auxiliary radiation source 66 must thus be switched on during the time in which no image generation by means of the image-generating module 5 is taking place. When an image is being generated by means of the image-generating module 5, the auxiliary radiation source 66 is to be switched off.

In the reverse case, if the layer 65 is brought into the reflective state by illumination by means of the radiation 67 of the auxiliary radiation source 66, the auxiliary radiation source 66 must always be switched on when an image is being generated by means of the image-generating module 5.

On the front side 11 of the spectacle lens 3, a filter layer 68 is applied, which filters the wavelength from the ambient light which corresponds to the wavelength of the auxiliary radiation 67. The layer 68 is thus designed for example such that UV radiation and/or infrared radiation is filtered out.

If UV radiation or radiation of another wavelength which can be harmful to the eye is used as auxiliary radiation 67, an absorber layer 69 which absorbs the auxiliary radiation is formed on the inside 14, with the result that the auxiliary radiation can be reliably prevented from entering the eye.

In the described embodiments of the display device 1 according to the invention the reflection of the virtual image into the user's field of view takes place via the first spectacle lens 3. Of course, a reflection via the second spectacle lens 4 is also possible. In addition, the display device 1 can be formed such that items of information or virtual images are reflected via both spectacle lenses 3, 4. The reflection can take place such that a three-dimensional image impression results. However, this is not absolutely necessary.

The spectacle lenses 3, 4 can have a refractive power of zero or a refractive power different from zero (in particular to correct vision defects). As is shown in the figures, both the front side 11 and the rear side 14 of the spectacle lens 3 are formed curved. In particular, the front side 11 can be spherically curved. If the spectacle lens has a refractive power different from zero, in order to correct defective vision, as a rule the curvature of the rear side 14 is chosen appropriately, in order to achieve the desired correction.

The holder 2 does not have to be formed as a spectacles-type holder. Any other type of holder with which the display device 1 can be fitted or worn on the head of the user is also possible.

The features of the described embodiment examples can, insofar as it is technically meaningful, be combined with each other in order to provide further embodiments of the display device according to the invention.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, the spectacle lens formed of a material, the spectacle lens comprising:
   a coupling-in section where light bundles of pixels of the image are coupled into the material of the spectacle lens;
   a coupling-out section where light bundles of pixels of the image are coupled out of the material of the spectacle lens;
   a front side;
   a rear side, wherein at least one of the front side and the rear side is curved; and
   a light guiding channel configured to guide the light bundles of pixels of the image within the material from the coupling-in section to the coupling-out section,
   wherein the coupling-out section comprises at least two deflecting surfaces arranged next to each other which are configured to reflect the light bundles in the direction of the rear side for the coupling-out, and
   wherein the deflecting surfaces are each configured as a switchable layer which can be switched into a first and a second state, wherein the reflectivity of the switchable layers in the first state is higher than in the second state.

2. The spectacle lens according to claim 1, wherein the at least two deflecting surfaces arranged next to each other are configured to be switched into the first and second state independently of each other.

3. The spectacle lens according to claim 1, wherein the coupling-out section comprises two groups arranged next to each other with, in each case, at least two deflecting surfaces arranged next to each other, wherein the deflecting surfaces in each case are formed as the switchable layer and the switchable layers of one of the two groups can be switched into the first and second state independently of the switchable layers of the other of the two groups.

4. The spectacle lens according to claim 1, wherein the deflecting surfaces are configured to reproduce a curved reflecting surface in a Fresnel manner, which includes an imaging property in addition to a pure beam deflection.

5. The spectacle lens according to claim 4, wherein the deflecting surfaces are flat.

6. The spectacle lens according to claim 1, wherein the deflecting surfaces are flat.

7. The spectacle lens according to claim 1, wherein the deflecting surfaces are curved.

8. The spectacle lens according to claim 1, wherein the deflecting surfaces each comprise an electrically switchable layer.

9. The spectacle lens according to claim 1, wherein the deflecting surfaces each comprise an optically switchable layer.

10. The spectacle lens according to claim 9, wherein the optically switchable layer comprises a passively switchable layer.

11. The spectacle lens according to claim 9, wherein the optically switchable layer comprises an actively switchable layer.

12. The spectacle lens according to claim 1, wherein on at least one of the front side and the rear side a switchable transmission layer is formed, wherein the transmittance of the switchable transmission layer is settable.

13. The spectacle lens according to claim 12, wherein the switchable transmission layer comprises an electrically switchable transmission layer.

14. The spectacle lens according to claim 12, wherein the switchable transmission layer comprises an optically switchable transmission layer.

15. A display device, comprising:
   a holder that can be fitted on the head of a user;
   an image-generating module secured to the holder, which can generate an image;
   an imaging optical system secured to the holder, the imaging optical system comprising a spectacle lens according to claim 1 and which, when the holder is fitted on the head, images the generated image such that the user can perceive it as a virtual image; and
   a control unit configured to actuate the switchable layers of the deflecting surfaces.

16. The display device according to claim 15, wherein the control unit is further configured to actuate the switchable layers of the deflecting surfaces such that the deflecting surfaces reflect the light bundles towards the rear side one after the other over time.

17. The display device according to claim 16, wherein the control unit is further configured to actuate the deflecting surfaces such that the field of view is maximized.

* * * * *